US008830484B2

United States Patent
Kereth (10) Patent No.: US 8,830,484 B2
(45) Date of Patent: Sep. 9, 2014

(54) DEVICE AND METHOD FOR OBJECT DETECTION AND LOCATION

(76) Inventor: Yefim Kereth, Rehovot (IL)

( * ) Notice: Subject to any disclaimer, the term of this patent is extended or adjusted under 35 U.S.C. 154(b) by 219 days.

(21) Appl. No.: 13/395,859

(22) PCT Filed: Sep. 5, 2010

(86) PCT No.: PCT/IL2010/000727
§ 371 (c)(1),
(2), (4) Date: Mar. 13, 2012

(87) PCT Pub. No.: WO2011/030333
PCT Pub. Date: Mar. 17, 2011

(65) Prior Publication Data
US 2012/0170057 A1  Jul. 5, 2012

(30) Foreign Application Priority Data
Sep. 13, 2009 (IL) ............................................ 200904

(51) Int. Cl.
*G01B 11/14* (2006.01)
*G01S 17/89* (2006.01)
*G01S 7/481* (2006.01)
*G01S 17/93* (2006.01)

(52) U.S. Cl.
CPC ............... *G01S 17/89* (2013.01); *G01S 17/93* (2013.01); *G01S 7/4811* (2013.01)
USPC ........................... 356/614; 356/613; 356/607

(58) Field of Classification Search
USPC ......................................... 356/614, 613, 607
See application file for complete search history.

(56) References Cited

U.S. PATENT DOCUMENTS

| 4,627,734 A | 12/1986 | Rioux |
|---|---|---|
| 4,916,536 A | 4/1990 | Kerr |
| 5,666,202 A * | 9/1997 | Kyrazis .......................... 356/614 |
| 5,808,728 A | 9/1998 | Uehara |
| 7,423,767 B2 * | 9/2008 | Steinsiek et al. ............... 356/614 |
| 2003/0123045 A1 | 7/2003 | Riegl |
| 2006/0131486 A1 | 6/2006 | Land |
| 2009/0138233 A1 * | 5/2009 | Kludas et al. ................. 702/158 |

* cited by examiner

Primary Examiner — Tarifur Chowdhury
Assistant Examiner — Isiaka Akanbi
(74) Attorney, Agent, or Firm — Stetina Brunda Garred & Brucker (57) ABSTRACT

An object detection and location system includes a sensor array for coupling to a support structure and a processing unit. At least one motor rotates first and a second reflectors about an axis parallel to an optical axis of the sensor array, and a light source projects a light beam toward the first reflector, which intercepts and reflects the light beam toward the object when the first reflector is directed toward the object, whereby at a given instant of time the light beam strikes the object and is reflected thereby as a second reflected light beam. The second reflector directs a field of view of the sensor array toward the object at the same instant of time to intercept the second reflected light beam and reflect it toward the sensor array.

10 Claims, 5 Drawing Sheets

DEVICE AND METHOD FOR OBJECT DETECTION AND LOCATION

CROSS-REFERENCE TO RELATED APPLICATIONS

The present application claims priority to International Application No. PCT/IL2010/000727 filed on Sep. 5, 2010.

STATEMENT RE: FEDERALLY SPONSORED RESEARCH/DEVELOPMENT

Not Applicable

BACKGROUND

1. Field of the Invention

The present invention relates to detection, location, mapping and displaying of objects in space.

2. Background of the Invention

Small and/or light-weight unmanned ground, aerial or marine vehicles, while moving in different kinds of areas, may be required to avoid obstacles. To avoid obstacles these vehicles need objects detection and location system. The higher the velocity of the vehicle, the shorter the time the operator or the vehicle controller have to avoid the obstacle. Therefore, in order allow the vehicle to avoid the obstacles, it is critical to detect the obstacles and to measure the range and the direction to the obstacles in a very short time. While it is quite feasible to adapt known object detection and mapping solutions to heavy vehicles, it is difficult to adapt known solutions to low-weight or miniature vehicles. To provide low-weight and miniature unmanned vehicles with object detection and mapping capabilities, there is thus a need for a low-cost, low-weight, fast-response approach to detecting and locating objects in space.

US 2006/0131486 discloses a flash ladar system where a laser directs a laser fan beam pulse to a scanning element that in turn directs the laser fan beam to a vertical region of space. Light reflected from an object in the vertical region of space is directed by a reflecting element to a sensor provided with a column of photosensitive pixels that connects to a charge storage matrix of non-photosensitive pixels. After an integration period electrical charges are shifted from the photosensitive region to an adjacent column in the charge storage region. This process is repeated for multiple integration periods until the charge storage region is filled with charges whereupon a serial shift register removes the information to be processed by a data processor.

U.S. Pat. No. 5,808,728 discloses a vehicle periphery monitoring system having a monitoring unit to monitor a periphery of a vehicle, based on output of a distance operation part and a scanning direction detector.

U.S. Pat. No. 4,916,536 discloses a range finder for wide angle video rate imaging that uses a radiation modulation for range determination to maintain accuracy at short ranges.

US 2003/123045 discloses an optoelectronic echo-based method for mapping out an object space in which beams of narrow and wide divergence are used for measurement and additionally for reliable, overlapping detection of reference markers.

U.S. Pat. No. 4,627,734 discloses a 3-dimensional imaging method for surface examination being independent of article movement to achieve full scanning using active triangulation.

BRIEF SUMMARY

Summary of the Invention

In accordance with the present invention there is provided a system and method for detection and location of an object, having the features of the independent claims.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION

Detailed Description Detailed Description of Embodiments

Figure 1A:
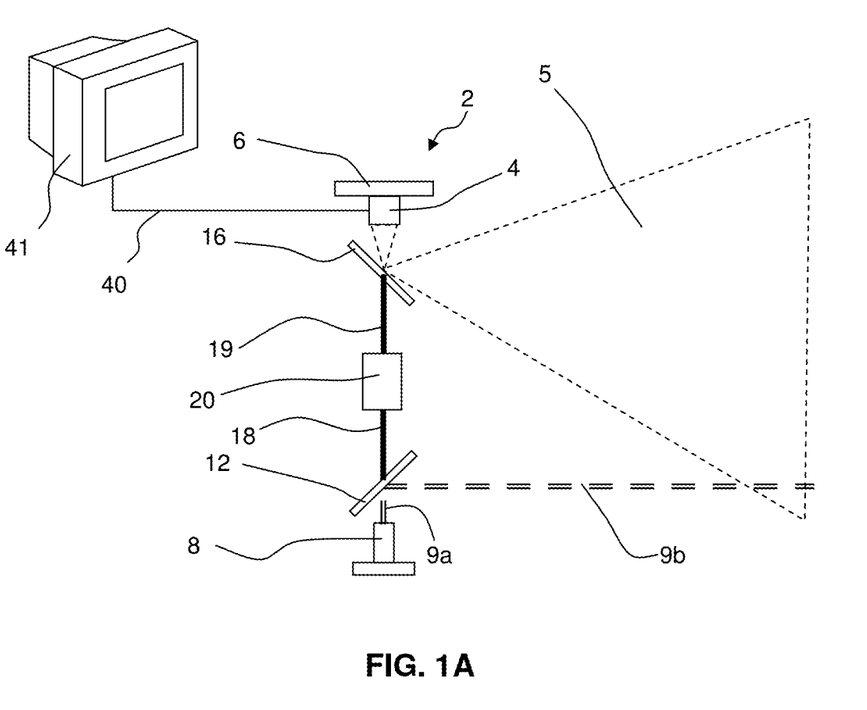
FIGS. 1A and 1B are schematic views of two basic configurations of a system according to different embodiments of the invention.
Figure 1B:
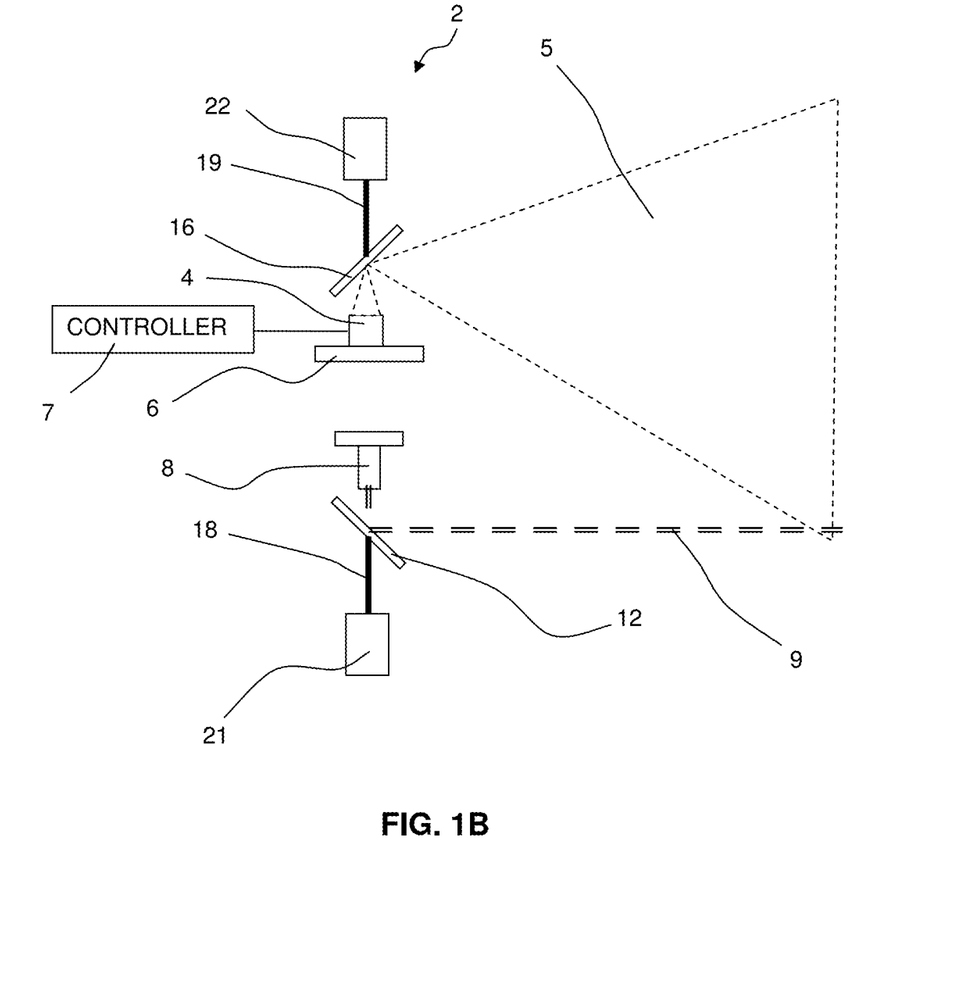

FIGS. 1A and 1B show schematically two configurations of a system for object detection, location, mapping and displaying, according to different embodiments of the invention. As seen, the system 2 includes a sensor array 4 that, in use, images a field of view 5 and is attached to a vehicle or to another support structure (not shown). The sensor array 4 is electronically coupled to a digital signal processor (DSP) 6 or, alternatively, to an onboard vehicle controller 7 or, via a communication link 40, to a remote monitor, which may be realized by a computer 41. The onboard vehicle controller 7 or DSP 6 or computer 41 executes an algorithm that derives the geometry of the object from the data obtained from the sensor elements of the sensor array 4. A light source 8 projects a light beam 9a in a direction of the sensor array 4 (FIG. 1A), or in a direction opposite to the sensor array (FIG. 1B). First and second reflecting surfaces 12, 16, respectively, are configured to rotate about a pair of shafts 18 and 19 commonly driven by a motor 20. The shafts 18 and 19 constitute an axis of rotation of the reflecting surfaces, which is in general parallel to the direction of the light beam of the light source 8.

The first reflecting surface 12 is configured to intercept the light beam 9a of the light source 8 and reflect the light beam 9a as a first reflected beam 9b toward an object when the first reflecting surface 12 is directed toward the object, whereby at a given instant of time the first reflected light beam 9b strikes the object and is reflected thereby as a second reflected light beam (not shown). The second reflecting surface 16 is configured to direct the field of view 5 of the sensor array 4 toward the object at the same instant of time so as to intercept the second reflected light beam whenever it appears in the field of view 5 and to reflect the second reflected light beam toward the sensor array. The reflecting surfaces 12 and 16 are rotated about the axis by a motor 20 (FIG. 1A) or by motors 21 and 22 (FIG. 1B).

The system 2 provides object detection and location in a plane perpendicular to the axis of the shafts 18 and 19. The geometry of the two-dimensional map of the plan is represented by an image created by the second reflected light beam on the sensor array 4 while the reflecting surfaces 12 and 16 are rotated by the motor 20 or by the motors 21 and 22. The image provided by the sensor array 4 can be displayed "as is" on a monitor 41 or PC screen, without image processing, or can be processed and presented to the operator and/or sent to the vehicle computer as a stream of data. To provide an accurate two-dimensional map of the plane, the centerline of the field of view 5 of the sensor array 4 should preferably be parallel to the centerline of the light beam 9. To allow for inaccuracies during manufacture, the system can be calibrated simply by a process of mapping a predefined range of objects having a known spatial geometry and by integrating the correction factors (e.g. look up tables) into the algorithm that runs on the DSP 6 or other processing unit, such as the vehicle controller 7 or the remote computer 41.

Figure 2A:
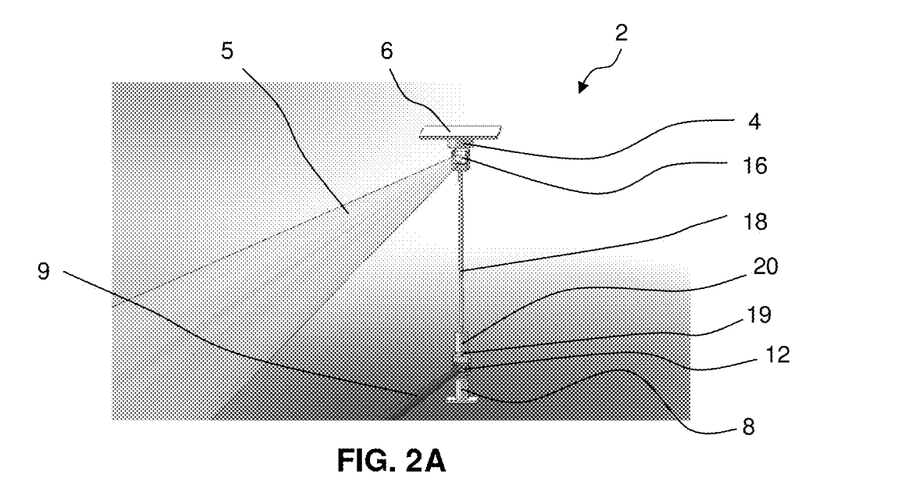
FIGS. 2A, 2B and 2C are, respectively, a perspective and detailed views of the system of FIG. 1A.
Figure 2B:
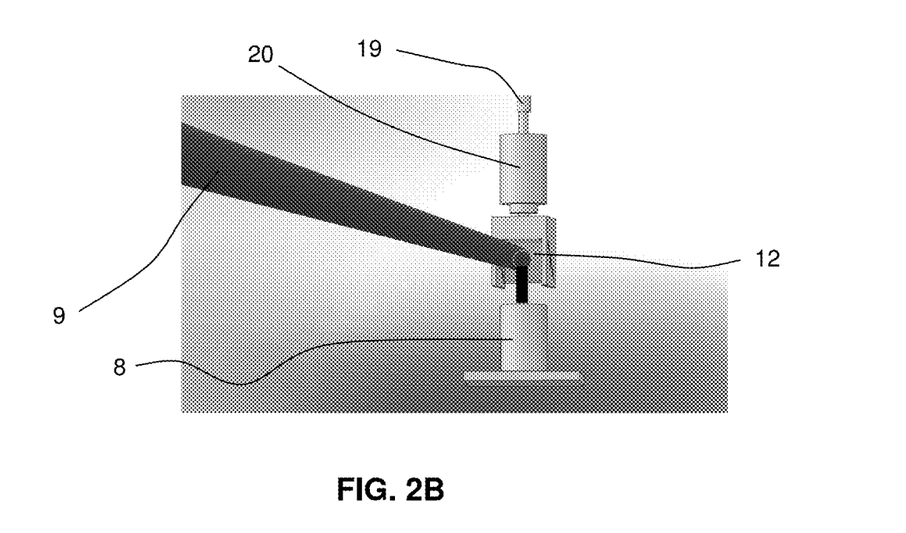
Figure 2C:
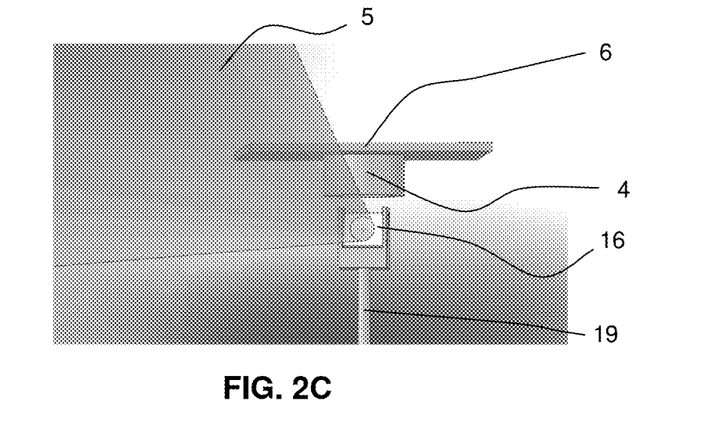
Figure 3A:
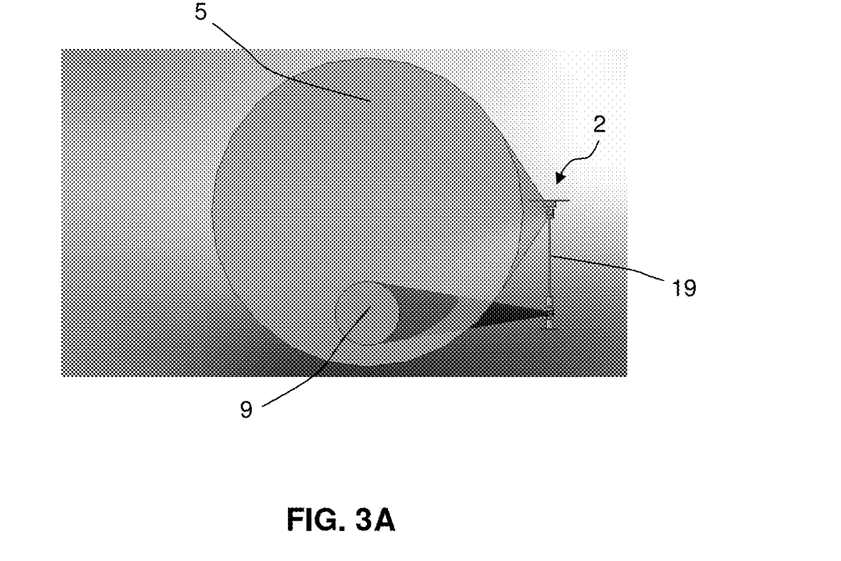
FIGS. 3A and 3B are, respectively, a far perspective view of the system of FIG. 1A and schematic view of the sensor's array of system.
Figure 3B:
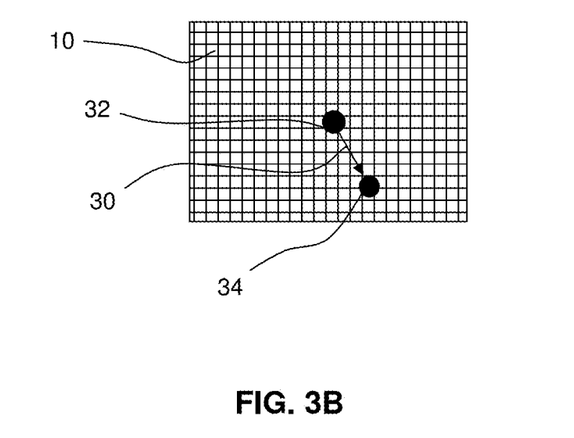

FIGS. 2A, 2B and 2C and 3A and 3B show further details of the system 2 and the mapping method. Light within the field of view 5 is reflected by the second reflecting surface 16 constituted by a planar mirror (FIGS. 2A and 2C) is collected by the sensor elements 10 of the sensor array 4 (FIG. 3B). The light-beam 9a of the light source 8 is reflected into space by the first reflecting surface 12 also typically constituted by a planar mirror (FIG. 2B). The mirrors 12 and 16 are coupled to the shafts 18 and 19, respectively, on a predefined distance from each other. Shafts 18 and 19 are driven by the motor drive 20 (FIG. 1A). Alternatively, when the shafts 18 and 19 cannot be commonly driven by the same motor, the mirrors 12 and 16 and their shafts 18 and 19 can be separately driven by two synchronized motor drives 21 and 22, with no mechanical link between them (FIG. 1B). The centre line of the field of view 5 of the sensor array 4 intercepted by the mirror 16, and the centre line of the light beam 9b reflected by the mirror 12, are preferably parallel and at a sufficient distance from each other to enable the light beam reflected by the object to be received on the sensor array 4 by a group of sensor elements 10, thus to create on the sensor array 4 a map of objects within the space around the vehicle and in view of the sensor. The direction from the system to the mapped objects as shown on the sensor corresponds to the direction from the sensor to the actual objects in a space.

The system 2 is capable of detecting and locating of objects either in a sector of a plane or in an entire periphery (up to 360 degrees) of the vehicle. The smaller the sector, the higher is the energy of the light beam per unit area and the higher the signal-to-noise ratio. The slower speed of rotation of the motor 20 (or motors 21 and 22), the higher the light beam energy per unit area and the higher the signal-to-noise ratio.

The detection and location of the object is based on a method that enables transmission of the geometry and location of real objects into an energy map created by energy absorption of the sensor elements 10 in a given area 34 on the sensor array 4 (FIG. 3B), which we will refer to as "active sensor elements". This energy map is a result of reflection of the light beam 9b from the object in a surrounding of the system (vehicle). Based on this method, the reflection from near objects is absorbed by sensor elements close to the margins of the sensor array 4, while reflection from far objects will be absorbed by sensor elements close to the centre of the sensor array 4. Once the energy map, describing the objects hit by the light beam 9b, is constructed, it becomes possible, based on this map, to define the direction and the distance to the object. To ensure the significance of the object detection, and to reduce the noise produced by radiation sources other than the light source 8, a filter (not shown) that is transparent to the wave length of the light source 8, can be placed in front of the sensor array 4, or elsewhere in the light transmission channel.

The detection algorithm can be simply based on summarizing the level of energy rise (the output) of the sensor elements 10, and identifying the location of the active sensor elements 34 being those with an energy level higher than a predefined threshold.

Based on the method according to the invention, the location of the detected object relative to the system 2 (vehicle) is represented by a single vector 30 (FIG. 3B), wherein the direction to the object is given by the direction of the vector and the distance to the object is calculated based on the length of the vector.

The direction of the vector is represented by the line connecting between an origin 32, where the rotation axis of the shafts 18 and 19 intersects the plane of the sensor array 4, and the geometric centre of the group 34 of the active sensor elements. The distance from the system 2 to the object is an inverse function of the length of the vector 30, which is given by the length of the line between the centre of the group 34 to the origin 32. Specifically, the distance from the system to the object can be calculated by dividing the geometric coefficient of the system 2 by the length of the vector. Neglecting distortion of the optical surfaces (e.g. lenses), the geometric coefficient can be calculated based on two parameters: field of view 5 and distance between the optical centreline of the field of view 5 and the axis of the light beam 9b.

Alternatively, to eliminate the need to compensate for optical distortion of the lens as well as errors caused by manufacturing tolerances, system 2 can be calibrated based on the object's range with predefined location geometry. In this case, look up tables are generated and integrated within the algorithm run by any one of the processing units 6, 7, 41.

Figure 4:
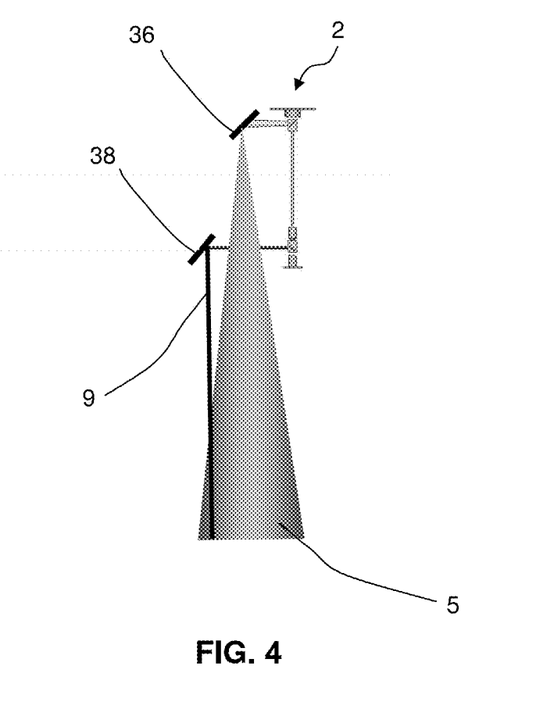
FIG. 4 is a schematic view of the system of FIG. 1A measuring the height above the terrain or above the sea bottom.

To allow distance measurement in a direction perpendicular to the scanning plane (i.e. parallel to the axis of the shafts 18 and 19), as may be required in aerial or marine applications, two or more additional mirrors 36 and 38 (FIG. 4) can be placed in a narrow sector to redirect the field of view 5 of the sensor array 4 and the projected light beam 9b down to the terrain or to the sea bottom. In this case a predefined sector of the sensor array 4 is allocated for the above-mentioned measurement technique.

The obstacle map, therefore, can be provided directly by the image on the sensor array 4, wherein the margins of the sensor array 4 represents the location in space close to the system 2 (and therefore to the vehicle), and the sensor elements 10 in between the margins and the center of the sensor array 4 represent a map of the plane around the system 2 (i.e. vehicle).

To allow a multi-plane or three-dimensional detection, location and mapping, the optical axis of the system 2 can be continuously moved in space in a controllable way. For example, this may be done using existing off-the-shelf equipment (e.g. pan-tilt systems) or any other suitable mechanism.

To enable real time obstacle avoidance, the DSP 6 or other processor attached to the sensor array 4 can provide the object location data to the onboard vehicle controller 7 or to the external computer 41 for the purpose of collision avoidance.

The unprocessed image provided by the sensor array 4 is completely consistent with the object's location map/geometry. Therefore, to provide an remote operator with an obstacle map in the least expensive way, the image generated by the sensor array 4 can be displayed "as is" on the operator's monitor without any additional processing. By deactivating the filter in the light path of the sensor array 4 it is possible to provide the operator with a 360 degrees peripheral image compatible to the above-mentioned obstacle map, using the same sensor array 4. By merging the peripheral image and the obstacle map data, better situational awareness can be achieved.

The small amount of hardware components needed for the construction of the system 2 and the simplicity of the detection and location algorithm, allows the weight, geometry and power consumption of system 2 to be minimized, thus making it suitable for small and miniature vehicles and other light-weight/low-cost applications.

The system is useful for a broad range of indoor, outdoor and field applications, and is not limited to obstacle detection and location only. The system is applicable to intruders' detection, location and verification. The detection can be provided based on changes in a map. Verification can be provided based on the image of a sensor array 4 by orienting the mirror 16 in a direction of the detection. Angular and/or linear controllable actuation of the system 2 can provide a multi-plane or three-dimensional scanning and/or mapping of the space in a cost-effective way.

The supply and the variety of sensor arrays and of other components of the system 2 allow fitting this system to a large number of different applications in a cost-effective way.

It will be understood that in embodiments where the reflecting surfaces are rotated by separate motors, they may or may not be rotated at the same speed. What is essential, however, is that for a given object the motors be synchronized so that both reflecting surfaces will be directed to the object at the same time.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description.

The invention claimed is:

1. A system for de don and location of an object, the system comprising:
   a sensor array having a plurality of sensor elements and being adapted for coupling to a support structure and to a processing unit
   first and a second reflecting surfaces configured to rotate about an axis of rotation;
   at least one motor for rotating the first reflecting surface and the second reflecting surface about said axis of rotation; and
   a light source for projecting a light beam along an optical path toward the first reflecting surface;
   said first reflecting surface being configured to intercept said fight beam and to reflect the light beam as a first reflected light beam, directed toward said object when the first reflecting surface is directed toward the object, whereby at a given instant of time the light beam strikes the object and is reflected thereby as a second reflected light beam;
   said second reflecting surface being configured to direct a field of view of the sensor array toward the object at said instant of time so as to intercept the second reflected light beam and to reflect the second reflected fight beam toward the sensor array; and
   the sensor array being attached to a support structure; characterized in that:
   the sensor array is an area sensor,
   the light beam is directed in one of; a direction of the sensor array and in a direction opposite to the sensor array,
   rotation of the first reflecting surface rotates the light beam so as to intersect objects that he in a plane perpendicular to the axis of the shafts,
   the sensor array is configured to represent the location of the detected object relative to the support structure as a vector, the vector having a vector length and a vector direction, wherein the direction of the object, relative to the sensor array defines the vector direction, and the distance between the object and the sensor array is determinable based on the vector length.

2. The system claimed in claim 1, wherein the processing unit includes a digital signal processor (DSP) configured for processing data obtained from the sensor elements and for providing the location of a detected object.

3. The system as claimed in claim 1, wherein the processing unit Mel tides one Of FA computer and an onboard vehicle controller configured for processing data obtained from the sensor elements and for providing the location of a detected object.

4. The system as claimed in claim 1, comprising additional reflectors disposed along the optical path for enabling a measurement of distance in other directions.

5. The system as claimed in claim 4, wherein one of the onboard vehicle controller and the computer is responsive to a measured location of an object in space for preventing collision between a vehicle and the object.

6. The system as claimed in claim 1, further comprising a monitor connected to the. sensor army for displaying the row data map provided by the sensor array.

7. system as claimed in claim 1, wherein the second reflected light beam strikes the sensor array at a location whose scalar displacentent from an origin of the sensor array is indicative of the distance of the detected object from the axis of rotation and whose angular displacement from an origin of the sensor array is indicative of the angular location of the detected object relative to the axis of rotation.

8. A method for transmitting the objects geometry and location in a plane into an energy max of the sensor elements in a plane of the sensor array, the method comprising:
   rotating first and a second reflecting surfaces about an axis of rotation;
   providing a sensor array that has a plurality of sensor elements and is adapted for coupling to a support structure and to a processing unit;
   projecting a light beam from a light source toward the first reflecting surface;
   intercepting said light beam by the first reflecting surface and reflecting the light beam toward said object as a first reflected light beam when the first reflecting surface is directed toward the object, whereby at a given instant of time the first reflected light beam strikes the object and is reflected thereby as a second reflected light beam; and
   synchronizing rotation of the second reflecting surface with rotation of the first reflecting surface so as to direct the second reflecting surface and a field of view of the sensor array at said instant of time so that the second reflecting surface intercepts the second reflected light beam reflected by the object and reflects the second reflected light beam toward the sensor array so as to strike the sensor elements thereof;
characterized in that
   the sensor array is an area sensor,
   rotation of the first reflecting surface rotates the light beam so as to intersect objects that lie in a pane of the rotating tight beam perpendicular to the axis rotation, and
   the sensor array represents the location of the detected object relative to the support structure as a vector, the vector having a sector length and a vector direction, wherein the direction to the object relative to the sensor array defines the vector direction, and the distance between the object and the sensor array is determinable based on the vector length.

9. The method as claimed in claim 8, wherein said sector connects a centre of the sensor array to the active sensor elements.

10. The method as claimed in claim 8, wherein the second reflected light beam strikes the sensor array at a location whose scalar displacement from an origin of the sensor array is indicative of the distance of the detected object from the axis of rotation and whose angular displacement from the origin of the sensor array is indicative of the angular location in said plane of the detected object relative to the axis of rotation.

* * * * *

UNITED STATES PATENT AND TRADEMARK OFFICE
CERTIFICATE OF CORRECTION

PATENT NO. : 8,830,484 B2  
APPLICATION NO. : 13/395859  
DATED : September 9, 2014  
INVENTOR(S) : Yefim Kereth Page 1 of 1

It is certified that error appears in the above-identified patent and that said Letters Patent is hereby corrected as shown below:

In the Claims column 5, claim 1, line 39, "de don" should be --detection--
column 5, claim 1, line 52, "fight" should be --light--
column 5, claim 1, line 61, "fight" should be --light--
column 5, claim 1, line 66, ";" should be --:--
column 6, claim 1, line 2, "he" should be --the--
column 6, claim 1, line 3, "the shaft" should be --rotation--
column 6, claim 3, line 16, "Mel tides" should be --includes--
column 6, claim 3, line 16, "OfFA" should be --of a--
column 6, claim 6, line 28, "." should be deleted
column 6, claim 6, line 28, "army" should be --array--
column 6, claim 7, line 30, "system" should be --System--
column 6, claim 7, line 32, "displacentent" should be --displacement--
column 6, claim 8, line 37, "the object" should be --an object's--
column 6, claim 8, line 38, "max" should be --map--
column 6, claim 8, line 61, insert --:--
column 6, claim 8, line 64, "a pane" should be --plane--
column 6, claim 8, line 65, "tight" should be --light--
column 7, claim 8, line 1, "sector" should be --vector--
column 7, claim 8, line 2, "to" should be --of--
column 7, claim 9, line 6, "sector" should be --vector--

Signed and Sealed this
Twenty-fourth Day of March, 2015

Michelle K. Lee
*Director of the United States Patent and Trademark Office*

UNITED STATES PATENT AND TRADEMARK OFFICE
CERTIFICATE OF CORRECTION

PATENT NO.        : 8,830,484 B2  
APPLICATION NO.   : 13/395859  
DATED             : September 9, 2014  
INVENTOR(S)       : Yefim Kereth Page 1 of 1

It is certified that error appears in the above-identified patent and that said Letters Patent is hereby corrected as shown below:

In the Claims column 5, claim 1, line 39, "de don" should be --detection--  
column 5, claim 1, line 52, "fight" should be --light--  
column 5, claim 1, line 61, "fight" should be --light--  
column 5, claim 1, line 66, ";" should be --:--  
column 6, claim 1, line 2, "he" should be --lie--  
column 6, claim 1, line 3, "the shaft" should be --rotation--  
column 6, claim 3, line 16, "Mel tides" should be --includes--  
column 6, claim 3, line 16, "OfFA" should be --of a--  
column 6, claim 6, line 28, "." should be deleted  
column 6, claim 6, line 28, "army" should be --array--  
column 6, claim 7, line 30, "system" should be --System--  
column 6, claim 7, line 32, "displacentent" should be --displacement--  
column 6, claim 8, line 37, "the object" should be --an object's--  
column 6, claim 8, line 38, "max" should be --map--  
column 6, claim 8, line 61, insert --:--  
column 6, claim 8, line 64, "a pane" should be --plane--  
column 6, claim 8, line 65, "tight" should be --light--  
column 7, claim 8, line 1, "sector" should be --vector--  
column 7, claim 8, line 2, "to" should be --of--  
column 7, claim 9, line 6, "sector" should be --vector--

This certificate supersedes the Certificate of Correction issued March 24, 2015.

Signed and Sealed this  
Eleventh Day of August, 2015

Michelle K. Lee  
*Director of the United States Patent and Trademark Office*